United States Patent [19]

Boeckmann

[11] Patent Number: 4,648,109
[45] Date of Patent: Mar. 3, 1987

[54] LIGHT EMITTING DIODE MESSAGE WAITING LAMP CIRCUIT

[75] Inventor: Eduard F. B. Boeckmann, Huntsville, Ala.

[73] Assignee: GTE Communication Systems Corp., Northlake, Ill.

[21] Appl. No.: 809,657

[22] Filed: Dec. 16, 1985

[51] Int. Cl.[4] .......................................... H04M 1/00
[52] U.S. Cl. .................................. 379/376; 379/385; 379/396
[58] Field of Search ............... 179/84 C, 84 R, 84 A, 179/84 L, 84 S, 81 C, 81 R, 18 AD, 99 LS, 27 FC, 27 FB, 99 H, 18 AD, 18 BG, 6.16, 2 A, 2 EC, 17 E, 18 FH, 18 HB, 27 FH, 94, 99 R

[56] References Cited

U.S. PATENT DOCUMENTS

| | | | |
|---|---|---|---|
| 3,748,403 | 7/1973 | Schartmann et al. | 179/99 LC |
| 4,440,981 | 4/1984 | Grantland et al. | 179/99 H |
| 4,529,843 | 7/1985 | Boeckmann | 179/81 R |

Primary Examiner—Gene Z. Rubinson
Assistant Examiner—C. Champion
Attorney, Agent, or Firm—Robert J. Black

[57] ABSTRACT

A circuit providing a message waiting indication using a light emitting diode and a constant current surge protected circuit for use with PABX extension telephone instruments. Recently developed light emitting diodes operated with current of one milliampere or less are effectively used in the present circuitry which limits current to the device in the operating mode and also as low leakage current while in the "off" mode.

17 Claims, 1 Drawing Figure

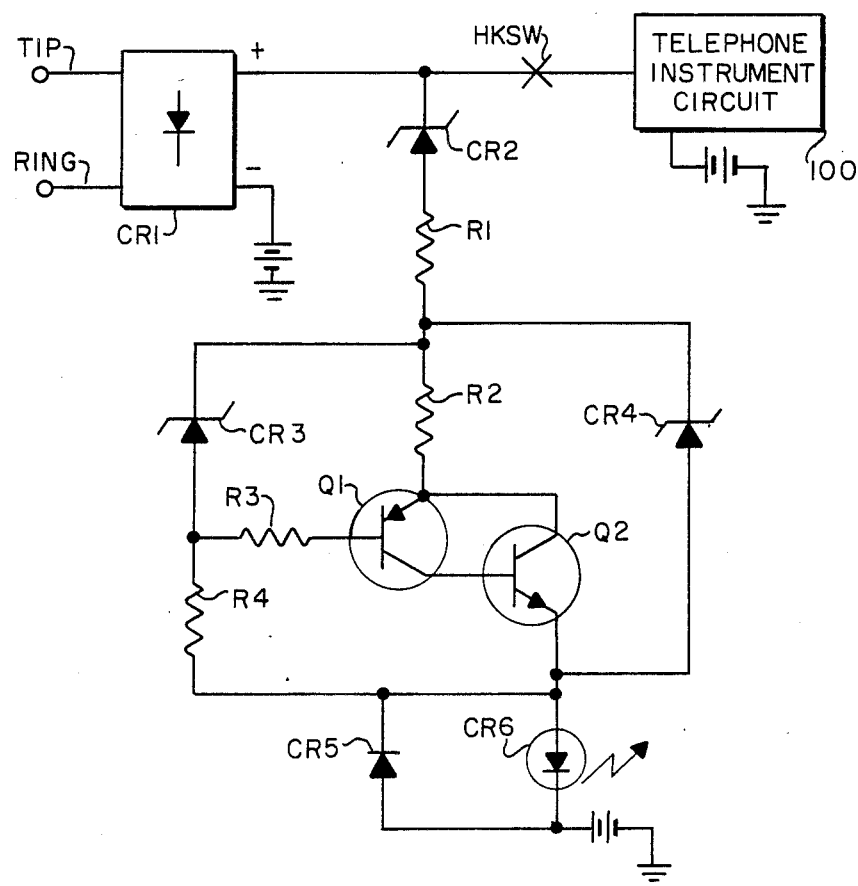

LIGHT EMITTING DIODE MESSAGE WAITING LAMP CIRCUIT

BACKGROUND OF THE INVENTION

(1) Technical Field

The present invention relates to telephone instruments and more particularly to a circuit for lighting a lamp at a subscriber's instrument to alert the subscriber that a message is waiting for them at an associated operator station or message center.

(2) Background Art

To alert a subscriber that a message is waiting, a light at the station is usually lit indicating the presence of a message. A means of light indication is required that typically requires a low current to operate. This current usually is in the order of less than one milliampere. Accordingly a circuit is required which regulates current to a light emitting diode so that excess current is not drawn and the light emitting diode still has sufficient brightness for the desired application.

Historically the message waiting function has been provided mainly by the use of incandescent or neon type lamps. The use of incandescent lamps is quite wasteful of current while neon lamps on the other hand are relatively expensive. Neon lamps, especially of the high brightness type are variable in the firing or breakdown voltage causing some problems also in choosing the proper operating voltage. The advantages of neon lamps are low operating current and low leakage below the firing voltage. However until recently light emitting diodes required relatively more operating current although operating voltage is low. A light emitting diode or "LED" as they are known, that operated at one milliampere or less of current with visible light output, was not available. Most recently the situation has changed and such LED units are now available.

The use of a light emitting diode as the only component of the message waiting indication circuit is unsatisfactory, because of the need to limit current to the device in the operating mode and also to be low in leakage current while in the "off" mode.

Originally attempts were made to utilize only an additional zener diode and a resistor in series with a light emitting diode. Such an arrangement was unable to provide the proper control and regulation of current to the light emitting diode. Another approach was the use of a conventional current source however an excessive amount of reference current was required which amounted to waste or lost current. Again the light emitting diode state-of-the-art was such that as much as possible of the available current must be fed to the light emitting diode. No wasted current could be tolerated. Thus it is obvious that it is desirable to develop a message waiting lamp circuit with low operating current and low leakage at lower cost than prior art neon and incandescent lamps. Since low current light emitting diodes are now available, it is the object of the present invention to provide the proper supporting circuit for such application of light emitting diodes.

SUMMARY OF THE INVENTION

The present invention consists of a zener diode employed as a turn on threshold establishing element, current limiting resistors, a composite resistor, a reference zener, a protective zener, a protective diode and of course the light emitting diode itself. The circuit also utilizes an existing polarity guard found in most telephone circuits which in most instances take a form of a diode bridge. This polarity guard, which is connected to the telephone central office via the telephone line, provides a source of positive voltage for operation of the circuitry of the present invention.

In operation the circuit is turned off at normal telephone line voltage of up to 68 volts DC. The circuit then becomes active at voltages of approximately 70 volts and higher, with visibility of the light emitting diode beginning at approximately 90 volts DC. The circuit therefore becomes active upon receiving the message waiting DC signal voltage of 104 to 130 volts and also in response to the receipt of ringing voltages. The message waiting signal results in a steady light indication whereas the ringing signal is indicated by an intermittent or pulsing light indication of the light emitting diode.

The circuit functions in the "on" mode to limit and regulate the flow of current to the light emitting diode by means of a current source formed by a composite transistor (a Darlington like configuration) and a reference zener diode. This current source requires only a very small reference current due to its very high DC gain. The reference current can also be fed through the light emitting diode so as to allow no waste. Two resistors are used to set the current for the current source. A relatively high value resistor is employed in series with the current source to provide protection against lightning surges by limiting current during a surge.

A zener diode is used to protect the composite transistor so that only low voltage transistors are required. Also at the higher ring signal voltages, the zener diode allows more current to flow through the light emitting diode for a brighter indication of the ringing signal.

BRIEF DESCRIPTION OF THE DRAWING

The single sheet of accompanying drawings is a simplified schematic of a light emitting diode message waiting lamp circuit in accordance with the present invention. Details of the associated telephone circuitry and the protective device are not shown in as much as they do not form a direct portion of the present invention and the details thereof are well known to those skilled in art.

DESCRIPTION OF THE PREFERRED EMBODIMENT

Referring now to the accompanying drawing, the main function of the components of the device are as follows: a polarity guard CR1 insures that a positive potential will be directed to the cathode of zener diode CR2 which acts as the gating element of the device. As noted before the polarity guard (usually a bridge) is not shown in detail in as much as its circuitry may have several forms that are well known to those skilled in the art. Zener diode CR2 must be a low leakage device with a high enough zener diode voltage to allow a turn on condition only above normal telephone line on-hook voltage.

Resistor R1 functions to limit surge current and provides current limiting at voltages above the maximum message waiting signal level.

Zener diode CR3 acts as a voltage regulator for the circuit path through resistor R2, to the emitter of transistor Q1 and from there to the base and through resistor R3, thereby forming the emitter and base current for transistor Q1. Transistor Q1 current is therefore constant and forces transistor Q2 into a constant collector current, thus forming a constant current source for the light emitting diode CR6. The reference current for the current source is through resistor R4 which is a relatively high value resistor. The reference current is quite small but is also fed through light emitting diode CR6 so that all current is used. Because the reference current is quite small, it does not significantly effect the current regulation through zener diode CR6.

As shown in the accompanying drawing, zener diode CR4 is shown with its anode connected to the anode of light emitting diode CR6. As an alternative the anode of diode CR4 could be connected to common if it is desired to shunt current at higher input voltages away from zener diode CR6. In this case the current through light emitting diode CR6 will be constant over a wide range of input voltages above the threshold voltage defined by zener diode CR2. On the other hand if maximum current is required, through the light emitting diode for the ringing voltage condition, zener diode CR4 should be connected as shown in the accompanying drawing.

Diode CR5 is connected to prevent excessive reverse voltage from appearing across light emitting diode CR6 which could damage the light emitting diode. It should be noted that the circuit is connected ahead of the hookswitch (HKSW) as seen in the accompanying drawing. This permits the circuit to function when the telephone instrument is in the on-hook mode. The present circuitry does not operate in the off-hook mode. It should also be noted as stated previously that the details of the telephone instrument are not shown as they are not pertinent to the present invention.

It is obvious that numerous modifications can be made to the present invention by those skilled in the art, without departing from the spirit of the invention which shall be limited only by the scope of the claims appended hereto.

What is claimed is:

1. A message waiting lamp circuit included in a telephone instrument connected to a central switching point, via a telephone line, said lamp circuit comprising:
   a light emitting diode;
   a constant current source connected to said diode;
   gating means connected between said telephone line and said constant current source;
   said constant current source operated in response to conduction of voltages above a predetermined threshold by said gating means from said central switching point via said telephone line, to provide operating current for said light emitting diode whereby said light emitting diode is operated.

2. A message waiting lamp circuit as claimed in claim 1, wherein: said voltage received from said central switching point via said telephone line is representative of a message waiting signal whereby said light emitting diode is operated to a steady state and in the alternative said voltage is representative of ringing signal whereby said light emitting diode is operated to a pulsing state.

3. A message waiting lamp circuit as claimed in claim 1, wherein: there is further included a polarity guard connected between said telephone line and said gating means, operated to insure that potential of proper polarity is conducted to said gating means.

4. A message waiting lamp circuit as claimed in claim 3, wherein: said polarity guard comprises a diode bridge circuit.

5. A message waiting lamp circuit as claimed in claim 1, wherein: said constant current source comprises a composite transistor circuit including first and second transistors.

6. A message waiting lamp circuit as claimed in claim 5, wherein: said first transistor is of the PNP type and said second transistor is of the NPN type.

7. A message waiting lamp circuit as claimed in claim 6, wherein: said constant current source further includes a reference current source.

8. A message waiting lamp circuit as claimed in claim 7, wherein: said reference current source is a resistor of between 700,000 and 800,000 Ohms in value.

9. A message waiting lamp circuit as claimed in claim 5, wherein: said constant current source further includes protective means.

10. A message waiting lamp circuit as claimed in claim 9, wherein: said protective circuit comprises a zener diode.

11. A message waiting lamp circuit as claimed in claim 1, wherein: said gating means comprise a zener diode.

12. A message waiting lamp circuit as claimed in claim 1, wherein: there is further included voltage regulation means.

13. A message waiting lamp circuit as claimed in claim 12, wherein: said voltage regulation means comprise a zener diode.

14. A message waiting lamp circuit as claimed in claim 1, wherein: there is further included current limiting means connected between said gating means and said constant current source operated to limit current at voltages above a predetermined level.

15. A message waiting lamp circuit as claimed in claim 14, wherein: said current limiting means comprise a resistor.

16. A message waiting lamp circuit as claimed in claim 1, wherein: there is further included protection means for said light emitting diode.

17. A message waiting lamp circuit as claimed in claim 16, wherein: said protection means comprise a diode.

* * * * *